United States Patent
Ozawa (10) Patent No.: US 8,866,976 B1
(45) Date of Patent: Oct. 21, 2014

(54) PROJECTOR AND METHOD OF CONTROLLING PROJECTOR

(71) Applicant: Seiko Epson Corporation, Tokyo (JP)

(72) Inventor: Takashi Ozawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 14/274,037

(22) Filed: May 9, 2014

(30) Foreign Application Priority Data

Jun. 14, 2013 (JP) ................................ 2013-125326

(51) Int. Cl.
  *H04N 3/23* (2006.01)
  *H04N 9/31* (2006.01)
  *H04N 9/28* (2006.01)
  *G03B 21/14* (2006.01)

(52) U.S. Cl.
  CPC .................................. *G03B 21/147* (2013.01)
  USPC ........... 348/745; 348/746; 348/806; 348/744; 353/69; 353/70

(58) Field of Classification Search
  USPC ......... 348/745, 746, 744, 806, 807, 607, 747; 353/70, 69; 315/370; 345/647
  See application file for complete search history.

(56) References Cited

U.S. PATENT DOCUMENTS

| 6,974,217 | B2 * | 12/2005 | Kimura et al. | ................... 353/69 |
| 2003/0223048 | A1 | 12/2003 | Kimura | |
| 2013/0335451 | A1 * | 12/2013 | Tsuji | ............................. 345/647 |

FOREIGN PATENT DOCUMENTS

| JP | A-9-261568 | 10/1997 |
| JP | A-2003-283963 | 10/2003 |

* cited by examiner

*Primary Examiner* — Jefferey Harold
*Assistant Examiner* — Jean W Desir
(74) *Attorney, Agent, or Firm* — Oliff PLC (57) ABSTRACT

A projector capable of notifying the user of the fact that the installation angle has been varied when the projector is in operation is provided. The projector includes an angle detector adapted to detect an installation angle of the projector, a keystone distortion correction device adapted to perform a keystone distortion correction of a projection image projected on the projection surface based on the installation angle detected by the angle detector, and a controller adapted to record a variation in the installation angle as installation angle variation information on the storage device in a case in which the angle detector detects the variation when the projector is in operation, and then announce occurrence of the variation in the installation angle in a case in which the installation angle variation information is recorded on the storage device in a power-OFF sequence of the projector.

6 Claims, 8 Drawing Sheets

```
INSTALLATION ANGLE VARIATION OF PROJECTOR
HAS OCCURRED IN THE LAST PROJECTION.

NUMBER OF OCCURRENCE: 2

TIME OF OCCURRENCE    ANGLE VARIATION         ~M1
   06/01 02:33     5.0 DEGREE
   06/01 01:45    10.5 DEGREE
```

FIG. 6A

```
INSTALLATION ANGLE VARIATION OF PROJECTOR
HAS OCCURRED DURING THE PROJECTION.

NUMBER OF OCCURRENCE: 2

TIME OF OCCURRENCE    ANGLE VARIATION         ~M2
   06/01 02:33     5.0 DEGREE
   06/01 01:45    10.5 DEGREE

PRESS Enter TO CONFIRM
```

PROJECTOR AND METHOD OF CONTROLLING PROJECTOR

CROSS-REFERENCE TO RELATED APPLICATION

The entire disclosure of Japanese Patent Application No. 2013-125326, filed Jun. 14, 2013, is expressly incorporated by reference herein.

BACKGROUND

1. Technical Field

The present invention relates to a projector and a method of controlling a projector.

2. Related Art

In the past, in a projector for projecting an image on a projection surface such as a screen, a distortion (a projection distortion) occurs in the projection image in the case in which the installation position of the projector fails to be the correct position with respect to the projection surface (e.g., the screen). For example, in the case in which tilted projection, in which the projection is performed with the projector tilted in a vertical direction or a horizontal direction with respect to the screen, is performed, there occurs a phenomenon (a keystone distortion) that the image displayed on the screen is distorted to have a trapezoidal shape. Therefore, as described in JP-A-9-261568 (Document 1), there has been known a projector, which forms an image distorted so as to cancel out the keystone distortion when forming the image with a light modulation device to thereby correct the projection image.

Further, as described in JP-A-2003-283963 (Document 2), there has also been disclosed a projector, which automatically detects the installation angle of the projector to perform the keystone distortion correction. According to such a projector, since the keystone distortion correction is performed in accordance with the installation angle, the trouble that the user manually performs the correction can be reduced.

In some cases, the projector is used for a demonstration in an unattended manner. In the case in which the projector is used in such a manner, the keystone distortion has occurred in the projection image in such a case that the projector has moved during the demonstration due to an unsound installation place, or that the projector has been moved by someone to thereby vary the installation angle. In such a case, by applying the configuration of the projector according to Document 2, the projection image can be corrected due to the automatic keystone distortion correction function. However, in some cases, the administrator (the user) fails to be aware of the fact that the installation angle of the projector varies when watching the projection image afterward since the projection image has been corrected by the automatic keystone distortion function. Therefore, there is a possibility that the counter measure such as readjustment of the installation place of the projector or prevention of the movement of the projector by other people is delayed.

Therefore, there has been demanded a projector capable of notifying the user of the fact that the installation angle has varied during the operation of the projector.

SUMMARY

An advantage of some aspects of the invention is to solve at least a part of the problems described above, and can be implemented as the following forms or application examples.

A projector according to this application example includes an image projection device adapted to modulate light emitted from a light source in accordance with image information based on an image signal input from an image input terminal, and then project the light modulated on a projection surface, an angle detector adapted to detect an installation angle of the projector, a keystone distortion correction device adapted to perform a keystone distortion correction of a projection image projected on the projection surface based on the installation angle detected by the angle detector, a storage device adapted to store information, and a controller adapted to record a variation in the installation angle as installation angle variation information on the storage device in a case in which the angle detector detects the variation when the projector is in operation, and the controller checks whether or not the installation angle variation information is recorded on the storage device in a power-OFF sequence of the projector, and then announces occurrence of the variation in the installation angle in a case in which at least one piece of the installation angle variation information is recorded on the storage device.

For example, it is possible to notify the user afterward of the fact that the variation in the installation angle has occurred in the projector during the unattended demonstration. Therefore, it becomes possible to prompt the user to take a measure such as the readjustment of the installation place of the projector or the prevention of the movement of the projector.

In the projector described above, it is preferable that the controller records the installation angle variation information after a predetermined time elapses from when powering ON the projector.

It becomes possible to prevent the installation angle variation information from being recorded during the initial settings such as an adjustment of the installation position of the projector with the external image output device connected.

In the projector described above, it is preferable that the installation angle variation information includes the time at which the angle detector detects the variation in the installation angle.

For example, it becomes possible to make use of the time to identify the factor of the variation in the installation angle of the projector.

In the projector described above, it is preferable that the controller powers OFF the projector in a case of recording a larger number of pieces of the installation angle variation information than a predetermined number when the projector is in operation.

Even in the case in which the projector is moved during the operation to get into the state in which the variation in the installation angle occurs repeatedly, it becomes possible to ensure the safety of the projector by powering OFF the projector.

In the projector described above, it is preferable that when powering ON the projector, the controller announces the fact that the variation in the installation angle of the projector has occurred in a case in which at least one piece of the installation angle variation information has been recorded.

For example, it becomes possible to check the notification contents again at power ON even in the case in which the notification contents fail to be checked when powering OFF the projector the last time.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Although an embodiment of the invention will hereinafter be explained with reference to the accompanying drawings, the embodiment described below does not limit the scope of the invention as set forth in the appended claims, and all of the combinations of the features in the embodiment are not necessarily essential for the means for solving the problem of the invention.

Embodiment

Figure 1:
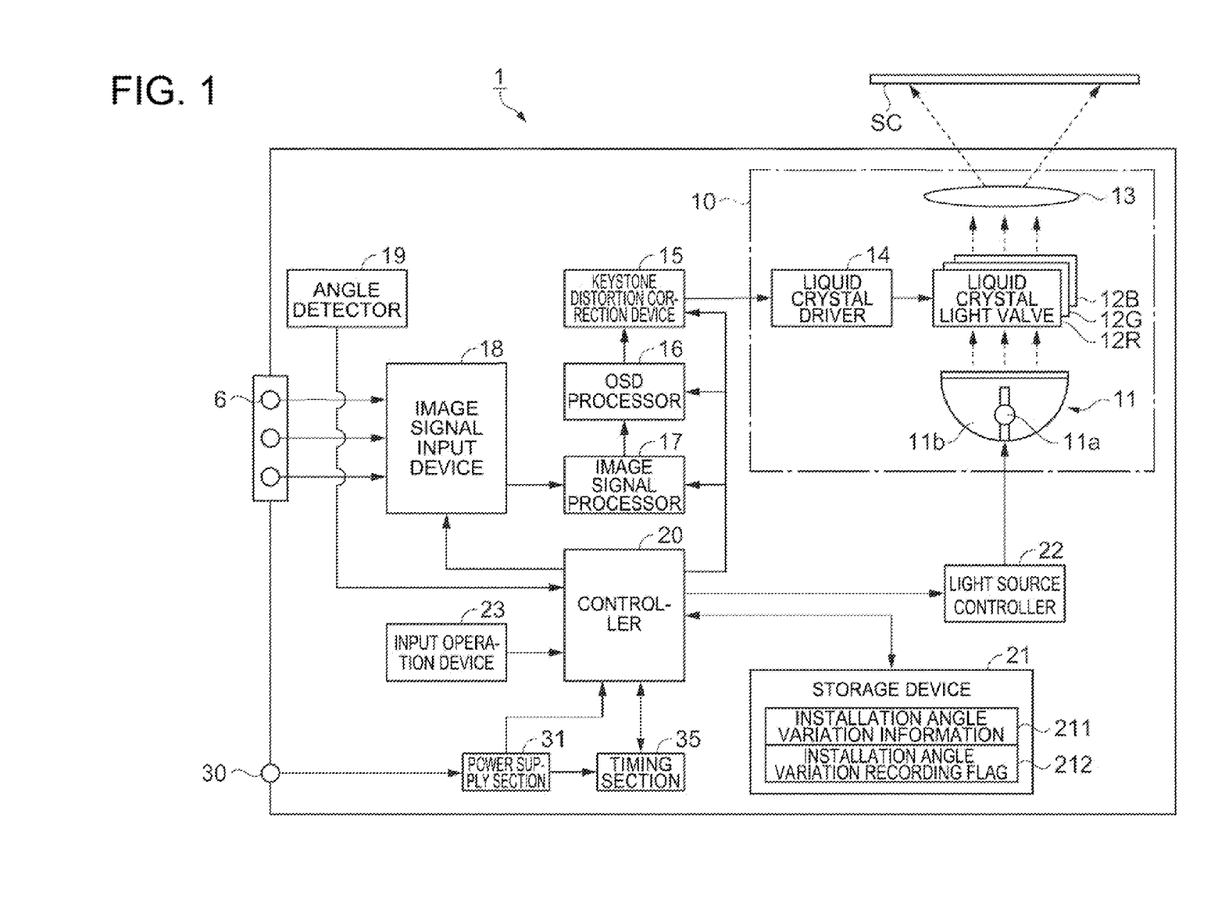
FIG. 1 is a block diagram showing a circuit configuration of a projector according to an embodiment of the invention.

FIG. 1 is a block diagram showing a circuit configuration of the projector 1 according to the present embodiment.

As shown in FIG. 1, the projector 1 is constituted by image input terminals 6, an image projection device 10, a keystone distortion correction device 15, an OSD processor 16, an image signal processor 17, an image signal input device 18, an angle detector 19, a controller 20, a storage device 21, a light source controller 22, an input operation device 23, a power supply terminal 30, a power supply section 31, a timing section 35, and so on, and these constituents are disposed inside or on an outer surface of a housing not shown.

The image projection device 10 includes a light source 11, three liquid crystal light valves 12R, 12G, and 12B as a light modulation device, a projection lens 13 as a projection optical system, a liquid crystal driver 14, and so on. The image projection device 10 modulates the light emitted from the light source 11 with the liquid crystal light valves 12R, 12G, and 12B, and then projects an image obtained by the modulation through the projection lens 13 to thereby display the projection image on a projection surface such as a screen SC.

The light source 11 is configured including a discharge light source lamp 11a formed of, for example, a super-high pressure mercury lamp or a metal halide lamp, and a reflector 11b for reflecting the light, which has been emitted by the light source lamp 11a, toward the liquid crystal light valves 12R, 12G, and 12B.

The light emitted from the light source 11 is converted into the light having a substantially even intensity distribution by an integrator optical system not shown, and is separated into colored light components of red (R), green (G), and blue (B), the three primary colors of light, by a color separation optical system not shown, and the colored light components subsequently enter the liquid crystal light valves 12R, 12G, and 12B, respectively.

Figure 2:
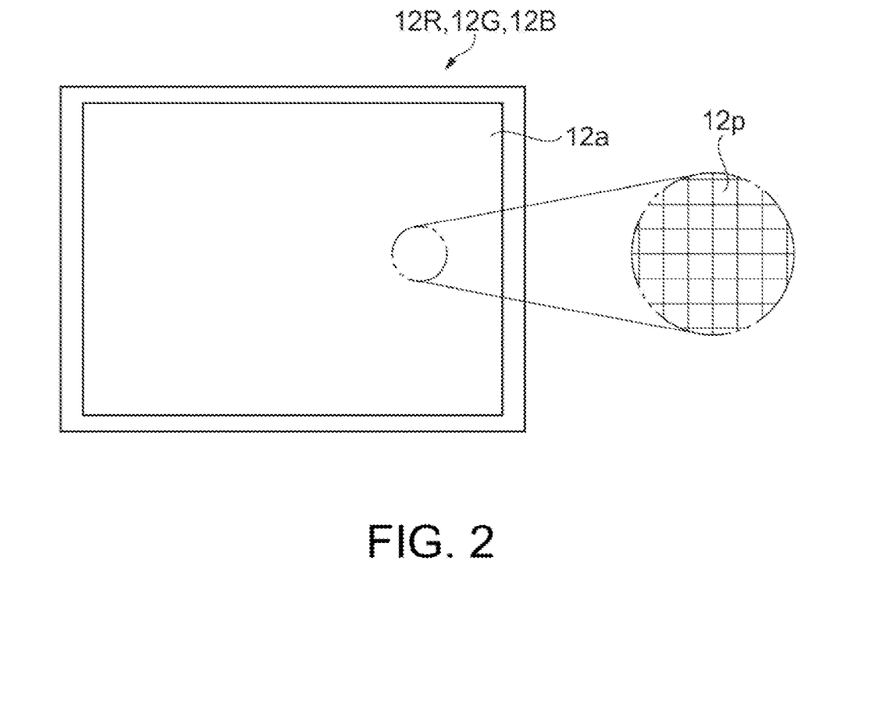
FIG. 2 is a front view showing a liquid crystal light valve.

FIG. 2 is a front view showing the liquid crystal light valves 12R, 12G, and 12B. The liquid crystal light valves 12R, 12G, and 12B are each formed of a liquid crystal panel having a liquid crystal material encapsulated between a pair of transparent substrates, and so on. As shown in FIG. 2, on the inner surface of each of transparent substrates, there are formed transparent electrodes (pixel electrodes) capable of applying drive voltages to the liquid crystal material in respective microscopic areas (pixels 12p) in a matrix in a rectangular area (a pixel area 12a).

When the liquid crystal driver 14 applies the drive voltages corresponding to image data input thereto to the respective pixels 12p, each of the pixels 12p is set to have a light transmittance corresponding to image information. Therefore, the light emitted front the light source 11 is modulated while being transmitted through the liquid crystal light valves 12R, 12G, and 12B, and thus the image light beams corresponding to the image information are formed for the respective colored light beams.

The image light beams of the respective colors are combined pixel-by-pixel by a color combining optical system not shown to be formed as a color image light beam, and then projected on the screen SC or the like in an enlarged manner by the projection lens 13.

Although in the present embodiment, there is described the projector 1 for performing the projection using the light source lamp 11a as the light source as an example, the invention can also be applied to a projector for performing the projection using a light emitting diode (LED) light source, a laser light source, or the like as the light source.

It should be noted that although in the present embodiment, there is described the projection optical system of the transmissive liquid crystal system using the three liquid crystal light valves 12R, 12G, and 12B as an example of the image projection device 10, it is also possible to adopt a light modulation device of other display system such as a reflective liquid crystal display system or a micromirror device system (a light switch display system).

Going back to FIG. 1, the controller 20 is provided with a central processing unit (CPU) not shown, a random access memory (RAM) used for temporarily storing various data, and so on, and operates in accordance with a control program (not shown) stored in the storage device 21 to thereby perform overall control of the operation of the projector 1. In other words, the controller 20 functions as a computer together with the storage device 21. Further, the controller 20 includes a timer not shown for measuring the time.

The storage device 21 is formed of a rewritable nonvolatile memory device such as a flash memory or a ferroelectric RAM (FeRAM). The storage device 21 stores the control program for controlling the operation of the projector 1, various setting data for defining, for example, operational conditions of the projector 1, and so on. In the present embodiment, there are stored a plurality of pieces of installation angle variation information 211 each representing a state of a variation of the installation angle detected by the projector 1 during the operation, and an installation angle variation recording flag 212 representing whether or not the installation angle variation information 211 is to be recorded.

The installation angle variation information 211 includes times when the installation angle variations are detected, the variations in the installation angle thus detected, and so on.

The input operation device 23 is provided with a plurality of operation keys for the user to provide various instructions to the projector 1. As the operation keys provided to the input operation device 23, there are cited a power key for alternately switching between ON and OFF of the power, an input switching key for switching between the image input terminals 6 to be input to the image signal input device 13, a menu key for displaying a configuration menu for performing a variety of settings in a superimposed manner, a cursor key for the user to select setting item from the menu, a decision key for determining the variety of settings, an escape key for moving back the screen presently used for performing the setting, and so on.

When the user operates a variety of operation keys of the input operation device 23, the input operation device 23 outputs an operation signal corresponding to the operation content of the user to the controller 20. It should be noted that the input operation device 23 can be arranged to have a configuration including a remote controller (remote control) signal receiving device (not shown) and a remote controller (not shown) capable of performing remote control. In this case, the remote controller emits an operation signal on, for example, an infrared ray corresponding to the operation content of the user, and then the remote control signal receiving device receives the operation signal and transmits the operation signal to the controller 20.

The angle detector 19 is configured including an acceleration sensor 19a (see FIG. 3) and so on, and detects the installation angle of the projector 1 based on an instruction of the controller 20. Then, the angle detector 19 informs the controller 20 of the installation angle thus detected.

Figure 3:
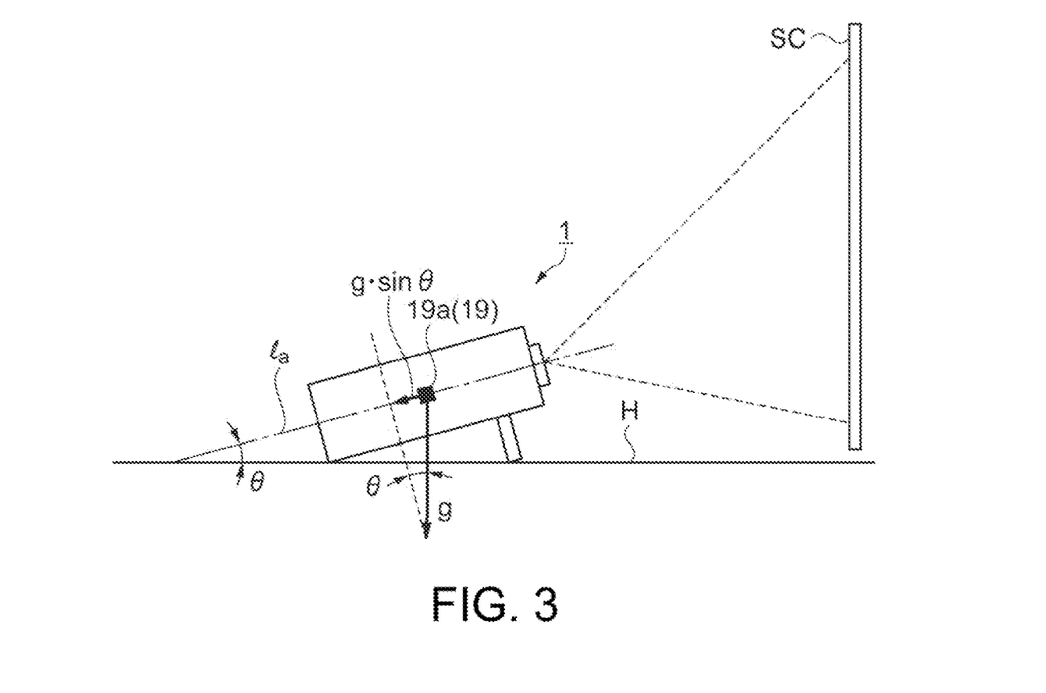
FIG. 3 is an explanatory diagram showing a principle of installation angle detection in the projector.

Here, a method of detecting the installation angle of the projector 1 will be explained. FIG. 3 is an explanatory diagram showing the principle of detecting the installation angle of the projector 1. The present diagram shows the projector 1, the installation surface H for the projector 1, and the screen SC viewed from the right side with respect to the projection direction. It is assumed that the installation surface H is horizontal. In the present embodiment, an acceleration sensor 19a is used for detecting the installation angle of the projector 1. The acceleration sensor 19a is mounted inside the projector 1, and detects the acceleration acting in the leftward direction (toward the rear of the projector 1) in FIG. 3 on the axis 1a shown in the drawing.

In the case in which the projector 1 is installed so as to be tilted with the installation angle θ as shown in FIG. 3, the acceleration component on the axis 1a is obtained as g·sinθ as shown in the drawing. The acceleration sensor 19a outputs a voltage corresponding to the acceleration component. Thus, the angle detector 19 can detect the installation angle of the projector 1 based on the voltage value output from the acceleration sensor 19a.

It should be noted that although it is assumed in the present embodiment that there is adopted a mechanism using the acceleration sensor 19a, the mechanism is not limited to the acceleration sensor 19a providing the mechanism can detect the installation angle of the projector 1.

Going back to FIG. 1, the light source controller 22 controls supply and stop of the power with respect to the light source 11 based on the instruction from the controller 20 to thereby switch between lighting and extinction of the light source 11.

The image information input from an external image output device such as a video reproduction device or a personal computer via, for example, a cable or communication equipment not shown is input to the image signal input device 18 from the plurality of image input terminals 6. The image information thus input is output to the image signal processor 17 based on the instruction of the controller 20. It should be noted that it is also possible to adopt a configuration in which the image signal input device 18 is provided with a receiving section of, for example, wireless communication or optical communication, and the image signal is input wirelessly from external equipment.

The image signal processor 17 converts the image information input from the image signal input device 18 into the image data representing the grayscales of respective pixels of the liquid crystal light valves 12R, 12G, and 12B based on the instruction of the controller 20. Here, the image information having been converted is separated so as to correspond to the colored light beams of red (R), green (G), and blue (B), and is constituted by a plurality of pixel values corresponding respectively to all of the pixels of the liquid crystal light valves 12R, 12G, and 12B. The pixel value is for determining the light transmission of the corresponding pixel, and defines the intensity (grayscale) of the light transmitted through and then emitted from the pixel.

Based on the instruction of the controller 20, the OSD processor 16 performs a process for displaying an on-screen display (OSD) image such as a menu image or a message image so as to be superimposed on the projection image. The OSD processor 16 is provided with an OSD memory not shown, and stores OSD image data representing figures, fonts, and so on for forming the OSD image.

When the controller 20 instructs the superimpose display of the OSD image, the OSD processor 16 reads the necessary OSD image data from the OSD memory, and then combines the OSD image data with the image data input from the image signal processor 17 so that the OSD image is superimposed at a predetermined position on the projection image. The image information combined with the OSD image information is then output to the keystone distortion correction device 15.

It should be noted that in absence of the instruction to superimpose the OSD image from the controller 20, the OSD processor 16 outputs the image data, which is input from the image signal processor 17, directly to the keystone distortion correction device 15.

In order to suppress the distortion (the keystone distortion) in which the projection image is enlarged in the direction of the tilt in the case of projecting the image in the state in which the projector 1 is tilted with respect to the screen SC, the keystone distortion correction device 15 performs the correction (the keystone distortion correction) of the image data thus input. Based on the information of the keystone distortion correction instruction input from the input operation device 23 and the information of the installation angle of the projector 1 detected by the angle detector 19, the controller 20 instructs the keystone distortion correction device 15 to perform the keystone distortion correction, and the keystone distortion correction device 15 performs the keystone distortion correction.

The keystone distortion correction is for skipping the pixel values from the image data to thereby shrink the projection image at a rate increasing along the direction of the tilt, and the keystone distortion correction device 15 outputs the image data thus corrected to the liquid crystal driver 14.

It should be noted that in the case in which the keystone distortion correction is not performed, the image data output from the OSD processor 16 is directly output to the liquid crystal driver 14.

When the liquid crystal driver 14 drives the liquid crystal light valves 12R, 12G, and 12B in accordance with the image data input from the keystone distortion correction device 15, namely the pixel value of each of the pixels 12p, the image corresponding to the image data is projected from the projection lens 13, and the projection image is displayed on the projection surface of the screen SC.

The power supply section 31 is externally supplied with the electricity such as 100V AC via the power supply terminal 30. The power supply section 31 converts the electricity (alternating-current power) input thereto into predetermined direct-current power, and supplies each section of the projector 1 with the direct-current power. Further, in accordance with the instruction of the controller 20, the power supply section 31 can switch between the state (the power-ON state) of supplying each section with the power (the operation power) necessary for the projection of the image and the state (the stand-by state) of halting the supply of the operation power and standing ready and waiting for the operation for switching the power ON.

The timing section 35 is a real-time clock, and is driven by a back-up power supply (not shown) to measure the time. The controller 20 obtains the current time from the timing section 35.

Then, the keystone distortion correction by the keystone distortion correction device 15 will be explained using FIGS. 4A through 4E, 5A, and 5B.

Figure 4A:
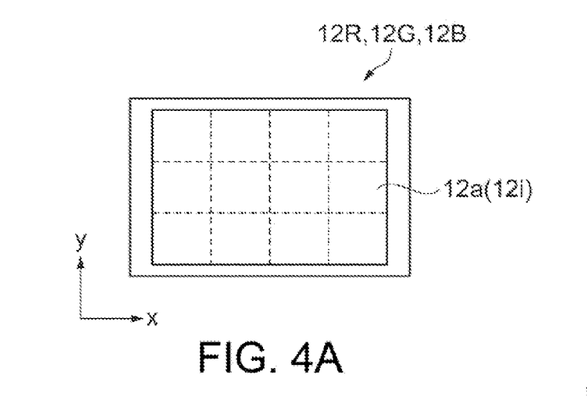
FIGS. 4A through 4E are explanatory diagrams for explaining the keystone distortion.
Figure 4B:
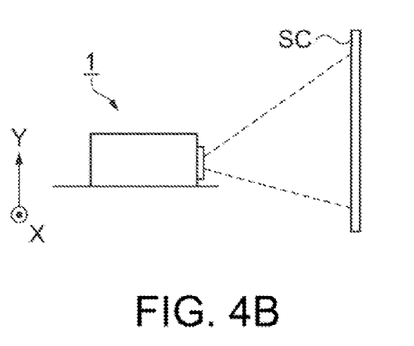
Figure 4C:
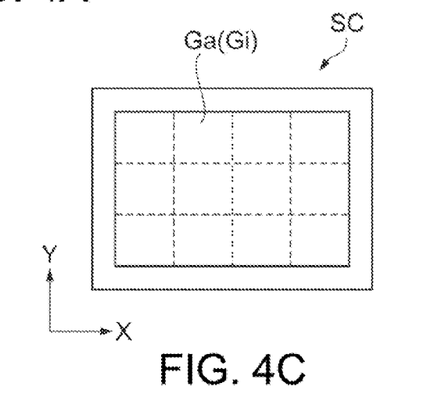
Figure 4D:
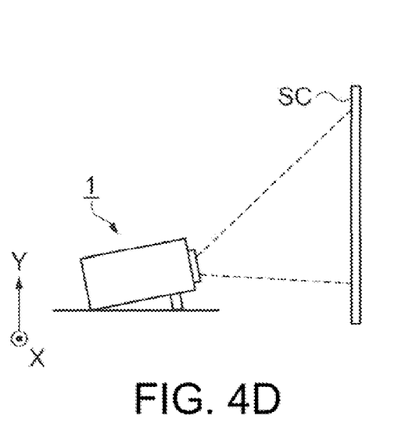
Figure 4E:
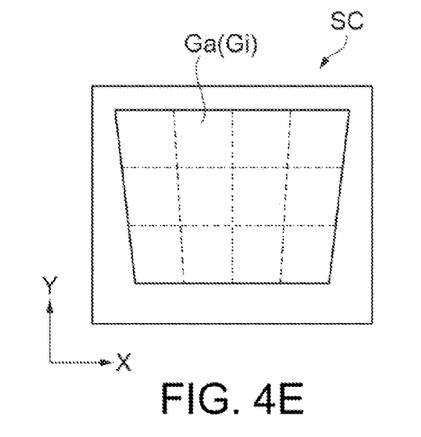

FIG. 4A through 4E are explanatory diagrams for explaining the keystone distortion, and show the state in which no keystone distortion is performed on the image data. Here, FIG. 4A is a front view of the liquid crystal light valves 12R, 12G, and 12B viewed from the side of the plane of incidence of light, FIG. 4B is a side view showing how the projector 1 performs projection horizontally, and FIG. 4C is a front view showing the projection image displayed on the screen SC on that occasion. Further, FIG. 4D is a side view showing how the projection is performed in the state in which the projector 1 is tilted, and FIG. 4E is a front view showing the projection image displayed on the screen SC on that occasion.

It should be noted that in FIGS. 4A through 4E it is assumed that right and left directions (right and left directions in a horizontal direction) are denoted as ±x directions, and upper and lower directions (horizontally upper and lower directions) are denoted as ±y directions when facing to the liquid crystal light valves 12R, 12G, and 12B, and that right and left directions (right and left directions in a horizontal direction) are denoted as ±X directions, and upper and lower directions (vertically upper and lower directions) are denoted as ±Y directions when facing to the screen SC. Here, the X direction and the Y direction of the screen SC correspond respectively to the x direction and the y direction of the liquid crystal light valves 12, and for example, the light transmitted through the pixel located in the upper right area (+x, +y side) of the pixel area 12a is projected on the upper right area (+X, +Y side) of the screen SC.

Further, in FIGS. 4A through 4E, 5A, and 5B, the lattice-like pattern shown in the pixel area 12a or the projection image Ga is formed of lines supplementarily added in order to show the correspondence between the image formed in the pixel area 12a and the projection image Ga projected on the screen SC, but does not mean that such a pattern is actually displayed.

As shown in FIG. 4A, in the case in which no keystone distortion correction is performed, the liquid crystal light valves 12R, 12G, and 12B each form the image (an input image Gi), which is based on the image data input from the keystone distortion correction device 15, in the entire pixel area 12a. In other words, in this case, the area (an image forming area 12i) for forming the input image Gi coincides with the pixel area 12a. Here, as shown in FIGS. 4B and 4C, in the case in which the projector 1 is installed horizontally, and performs the projection without the tilt with respect to the screen SC, the projection image Ga (the input image Gi) displayed on the screen SC becomes to have a rectangular shape identical to that of the pixel area 12a.

On the other hand, as shown in FIGS. 4D and 4E, in the case in which the projector 1 is installed with a tilt with respect to the screen SC, and performs the projection toward the upper side (in the +Y direction), the projection image Ga displayed on the screen SC is enlarged in the ±X directions and the +Y direction at a rate increasing along the direction of the tilt (toward the +Y direction), and is distorted to have a trapezoidal shape. In the present embodiment, the keystone distortion correction performed in the case in which the oblique projection with the tilt in the +Y direction (the vertical direction) is performed in such a manner will be described.

Figure 5A:
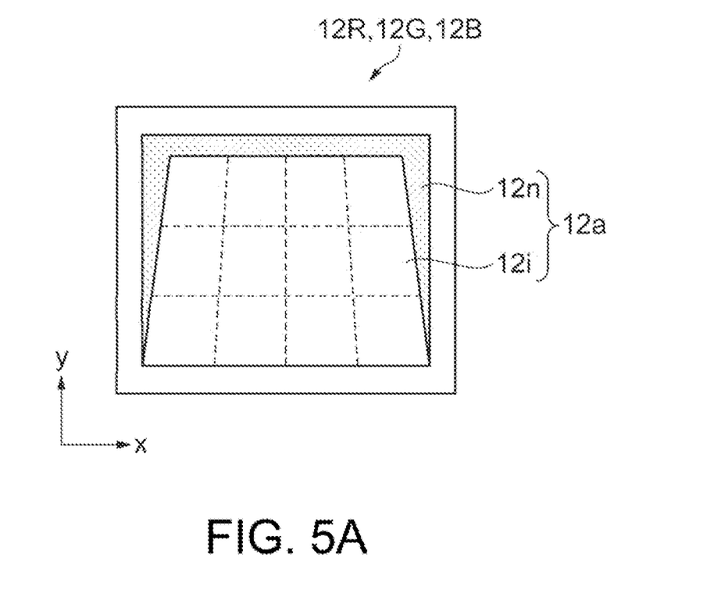
FIGS. 5A and 5B are explanatory diagrams for explaining the keystone distortion correction.
Figure 5B:
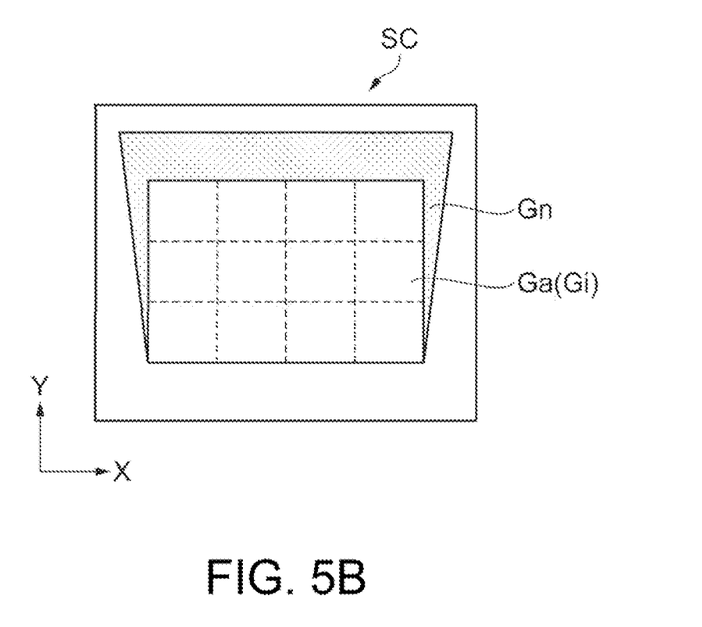

FIGS. 5A and 5B are explanatory diagrams for explaining the keystone distortion correction, wherein FIG. 5A is a front view of the liquid crystal light valves 12R, 12G, and 12B viewed form the side of the plane of incidence of light, and FIG. 5B is a front view showing the projection image displayed on the screen SC when performing the oblique projection.

The keystone distortion correction device 15 performs the skipping of the pixel values from the image data input from the OSD processor 16 to thereby perform such a correction of shrinking the projection image Ga at a rate increasing in the direction of the tilt (toward the +Y direction) compared to the case in which the correction is not performed (see FIG. 4E).

Specifically, as shown in FIG. 5A, the keystone distortion correction device 15 forms the image forming area 12i in the pixel area 12a of each of the liquid crystal light valves 12R, 12G, and 12B so as to have a trapezoidal shape oriented oppositely to the projection image Ga on which the correction is not performed, namely the shape having the lateral dimension tapering along the direction (toward the +y direction) of the tilt. Further, the image forming area 12i is shrunk in vertical directions (the ±y directions) so that the aspect ratio of the projection image Ga after the correction becomes the same as the aspect ratio of the projection image Ga on which the correction is not performed.

Further, the keystone distortion correction device 15 corrects the image data so that the light transmission of each of the pixels 12p included in an area 12n located outside the image forming area 12i is minimized.

As a result, since the deformation of the input image Gi due to the oblique projection can be corrected, and at the same time, the light is hardly applied to the area Gn in the projection image Ga, corresponding to the area 12n, the input image Gi is displayed on the screen SC with the normal shape (the rectangular shape) as shown in FIG. 5B. It should be noted that in order to make up for the lack in the grayscale information due to the skipping of the pixel values, it is desirable to correct the pixel values of the pixels adjacent to the pixels object of the skipping in accordance with the pixel values to be skipped.

Then, an operation of the projector 1 according to the present embodiment will be explained using FIGS. 6A, 6B, and 7 through 10.

Figure 6A:
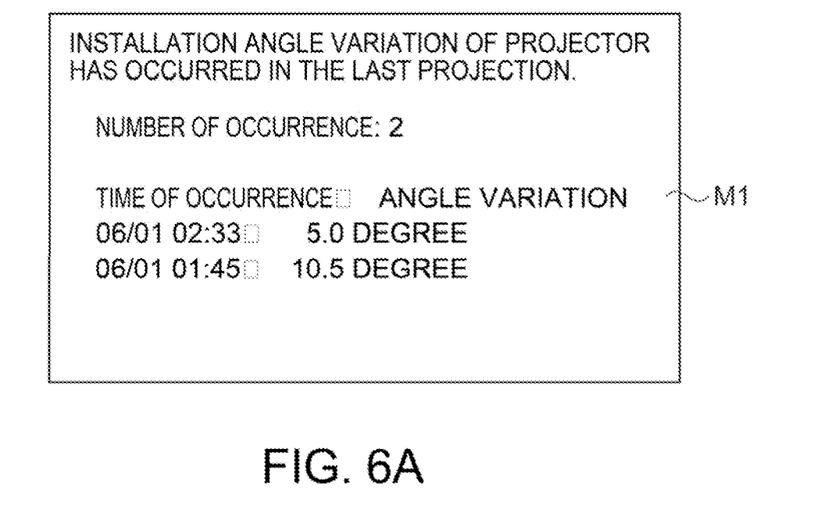
FIGS. 6A and 6B are diagrams showing an example of images for giving notice of installation angle variation information.
Figure 6B:
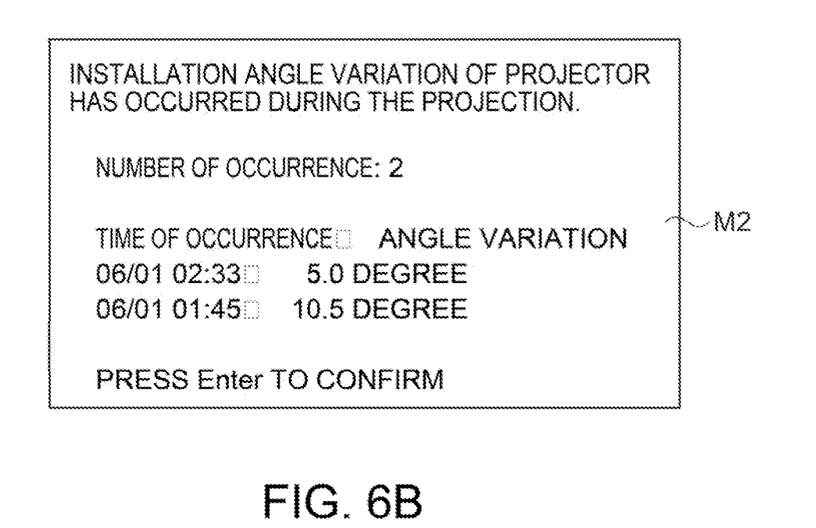

FIGS. 6A and 6B are diagrams showing an example of images for giving notice of installation angle variation information 211, wherein FIG. 6A is a diagram showing an image for giving notice of the installation angle variation information in the case in which the projector 1 is powered ON, and FIG. 6B is a diagram showing an image for giving notice of the installation angle variation information in the case in which the projector 1 is powered OFF.

Figure 7:
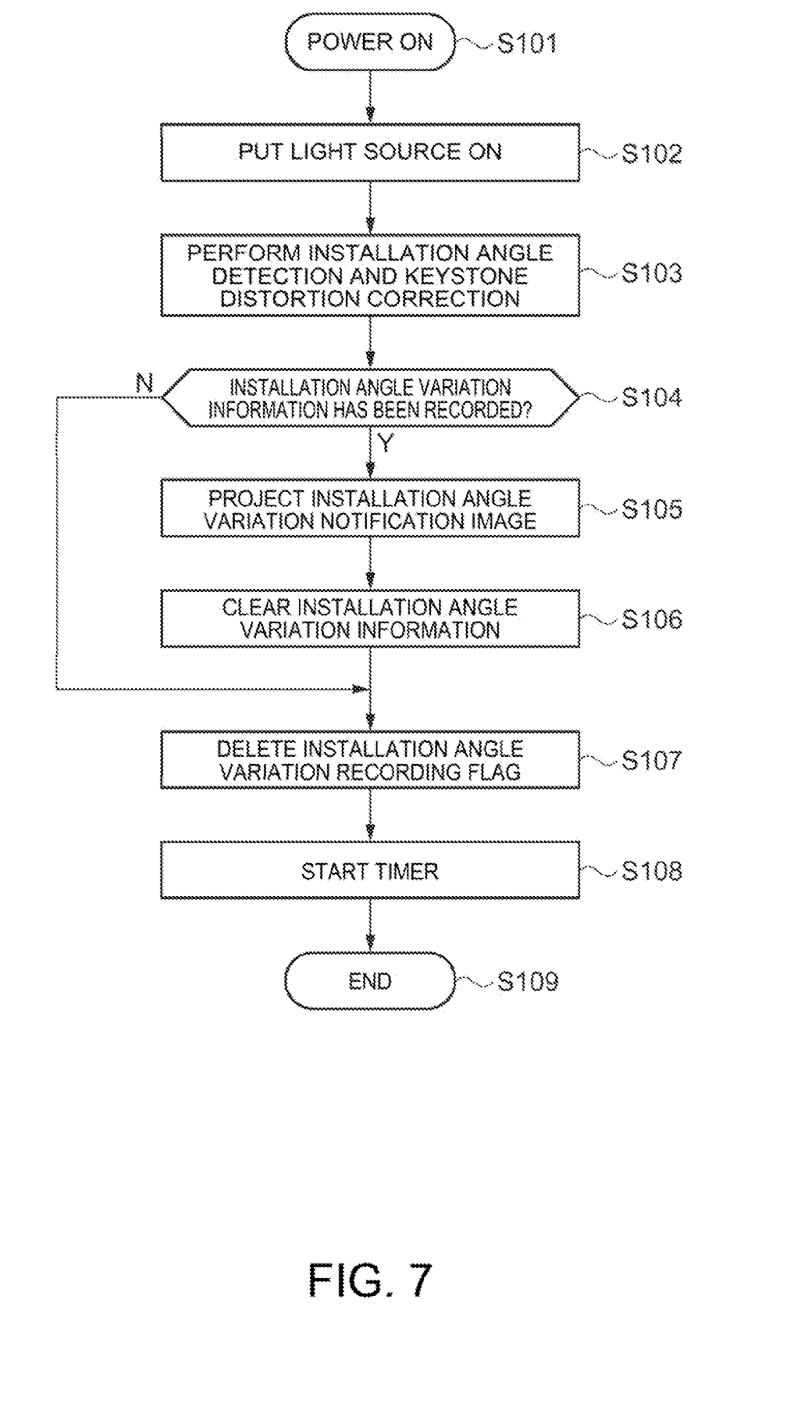
FIG. 7 is a flowchart showing a power-ON sequence of the projector.
Figure 8:
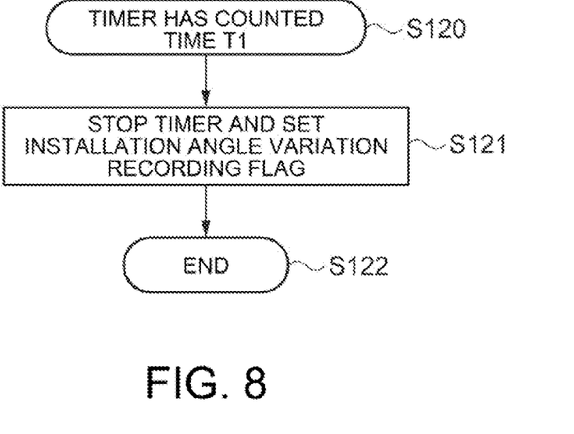
FIG. 8 is a flowchart showing an operation when a timer has counted a predetermined time.
Figure 9:
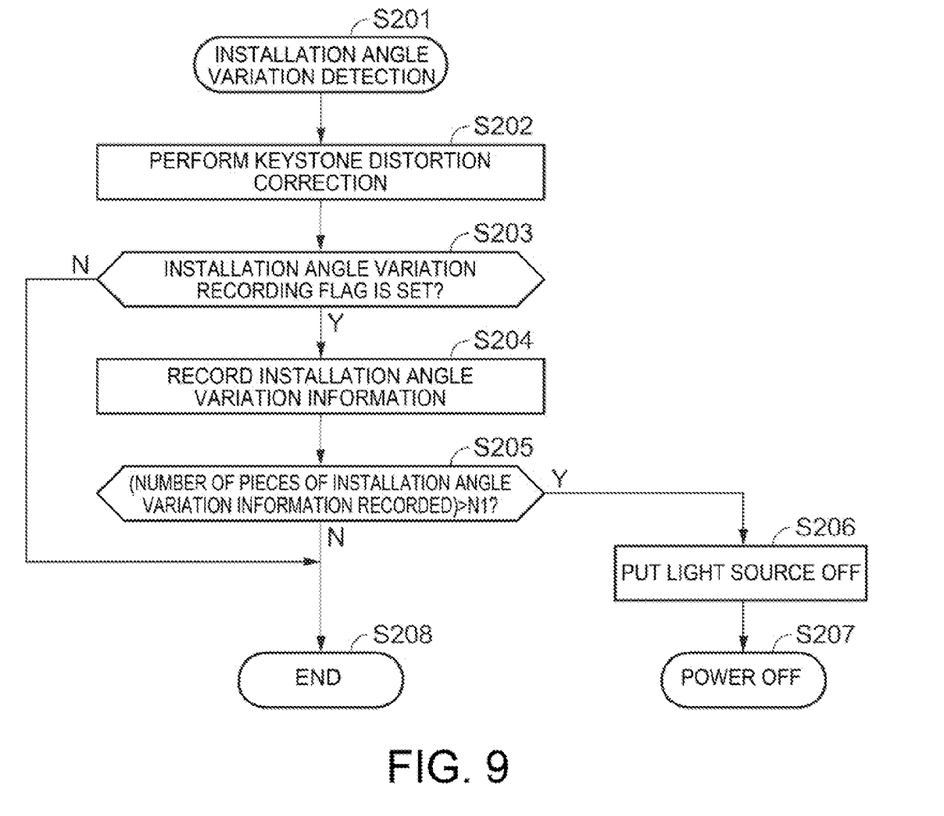
FIG. 9 is a flowchart showing an operation when the projector detects the variation in the installation angle during the operation.
Figure 10:
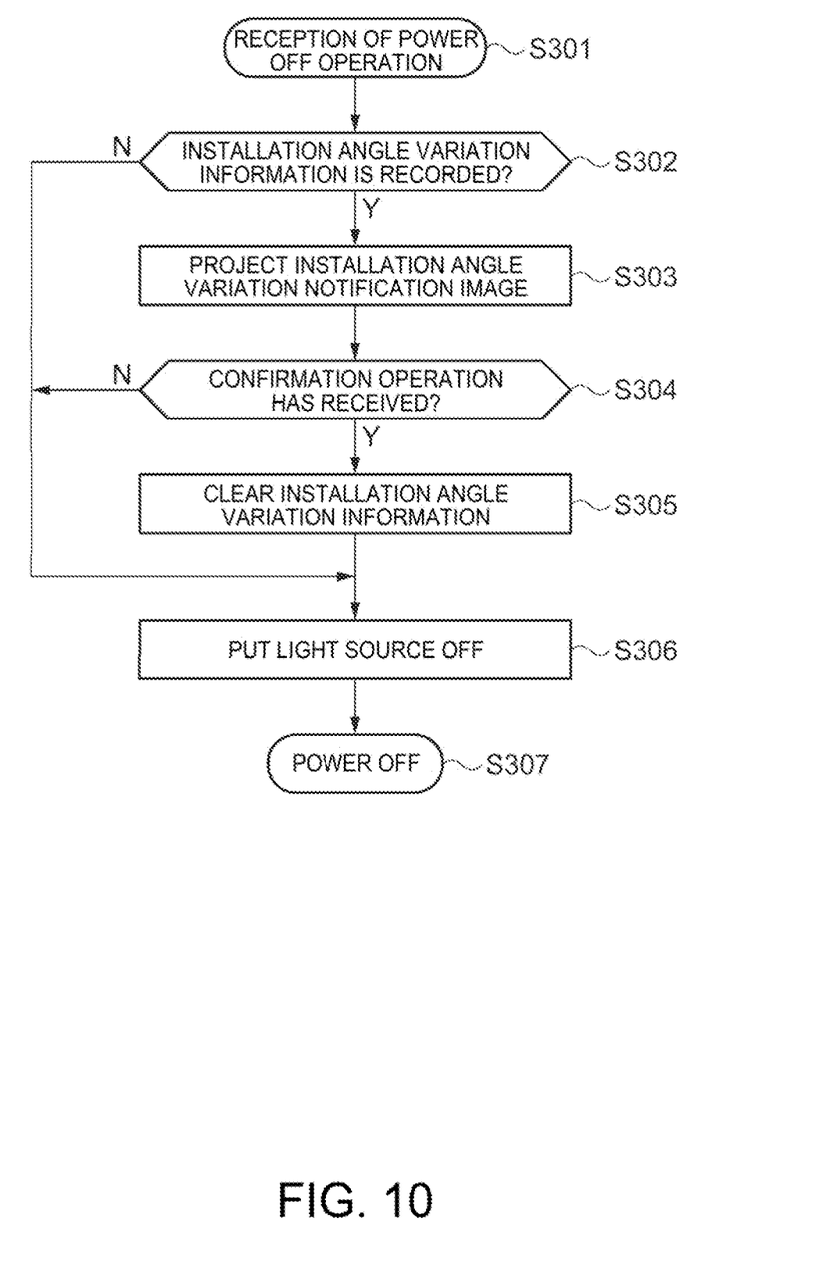
FIG. 10 is a flowchart showing a power-OFF sequence of the projector.

FIG. 7 is a flowchart showing an operation (a power-ON sequence) in the case of powering ON the projector 1, FIG. 8 is a flowchart showing an operation in the case in which the timer has counted a predetermined time, FIG. 9 is a flowchart showing an operation in the case in which the projector 1 has detected a variation in the installation angle during the operation, and FIG. 10 is a flowchart showing an operation (a power-OFF sequence) in the case of powering OFF the projector 1.

Operation At Power ON (Power-ON Sequence)

As shown in FIG. 7, when the projector 1 is powered ON (step S101) using the power key of the input operation device 23 or the like, the controller 20 instructs the light source controller 22 to put on (step S102) the power source 11, and then the process makes the transition to the step S103.

In the step S103, the controller 20 detects the installation angle using the angle detector 19, and then makes the keystone distortion correction device 15 perform the keystone distortion correction based on the installation angle thus detected, and the process makes the transition to the step S104. The step S103 corresponds to the angle detection step and the keystone distortion correction step.

In the step S104, the controller 20 checks whether or not one or more pieces of the installation angle variation information 211 are recorded on the storage device 21. In the case in which one or more pieces of the installation angle variation information 211 are stored (Y in the step S104), the process makes the transition to the step S105. In the case in which no piece of the installation angle variation information 211 is recorded (N in the step S104), the process makes the transition to the step S107. It should be noted that it is also possible to check whether or not the installation angle variation information 211 is recorded on the storage device 21 prior to the step S104.

In the step S105, the controller 20 projects an installation angle variation notification image M1 shown in FIG. 6A using the image projection device 10. In the installation angle variation notification image M1, there are displayed storage contents (e.g., installation angle variation detection times and installation angle variations) of the installation angle variation information 211. Then, the process makes the transition to the step S106. The step S105 corresponds to an annunciation step.

In the step S106, the controller 20 deletes all pieces of the installation angle variation information 211 in the storage device 21, and then the process makes the transition to the seep S107.

In the step S107, the controller 20 clears an installation angle variation recording flag 212, and then the process makes the transition to the step S108.

In the step S108, the controller 20 starts the timing by the timer, and then the process makes the transition to the step S109.

In the step S109, the projector 1 starts the projection of the image, and the operation flow is terminated.

Operation When Timer Has Counted Predetermined Time

As shown in FIG. 8, when the timer has counted a time T1 (e.g., 30 seconds) as a predetermined time (step S120), the controller 20 stops the timing by the timer, and then sets (step S121) the installation angle variation recording flag 212. This is the end of the operation flow (step S122).

Operation Upon Detection of Installation Angle Variation

As shown in FIG. 9, when the projector 1 detects (step S201) that the installation angle has varied using the angle detector 19 during the operation, the controller 20 makes (step S202) the keystone distortion correction device 15 perform the keystone distortion correction based on the installation angle thus detected. Then, the process makes the transition to the step S203. The step S201 corresponds to the angle detection step, and the step S202 corresponds to the keystone distortion correction step.

In the step S203, the controller 20 checks whether or not the installation angle variation recording flag 212 is set. In the case in which the installation angle variation recording flag 212 is set (Y in the step S203), the process makes the transition to the step S204. In the case in which the installation angle variation recording flag 212 is cleared (N in the step S203), the process makes the transition to the step S208.

In the step S204, the controller 20 obtains the current time from the timing section 35, and records the current time on the storage device 21 as the installation angle variation information 211 together with the variation of the installation angle detected in the step S201, and then the process makes the transition to the step S205. The step S204 corresponds to the installation angle variation recording step.

In the step S205, the controller 20 checks whether or not the number of the recorded pieces of the installation angle variation information 211 recorded on the storage device 21 exceeds a predetermined number N1 (e.g., 10). In the case in which the number of pieces of the installation angle variation information 211 exceeds the predetermined number N1 (Y in the step S205), the process makes the transition to the step S206. In the case in which the number of pieces of the installation angle variation information 211 does not exceed the predetermined number N1 (N in the step S205), the process makes the transition to the step S208.

In the step S206, the controller 20 instructs the light source controller 22 to put off the light source 11, and then the process makes the transition to the step S207.

In the step S207, the controller 20 powers OFF the projector 1 to make the transition to a standby state.

In the step S208, the operation flow is terminated.

Operation At Power OFF (Power-OFF Sequence)

As shown in FIG. 10, when the projector 1 receives (step S301) the power-OFF operation using the power key of the input operation device 23 or the like during the operation, the process makes the transition to the step S302.

In the step S302, the controller 20 checks whether or not one or more pieces of the installation angle variation information 211 are recorded on the storage device 21. In the case in which one or more pieces of the installation angle variation information 211 are stored (Y in the step S302), the process makes the transition to the step S303. In the case in which no piece of the installation angle variation information 211 is recorded (N in the step S302), the process makes the transition to the step S306.

In the step S303, the controller 20 projects an installation angle variation notification image M2 shown in FIG. 6B using the image projection device 10. In the installation angle variation notification image M2, there are displayed storage contents (e.g., installation angle variation detection times and installation angle variations) of the installation angle variation information 211. Then, the process makes the transition to the step S304.

In the step S304, the controller 20 checks whether or not a predetermined confirmation operation is received within a predetermined period with respect to the installation angle variation notification image M2 having been projected in the step S303. In the case in which the predetermined confirmation operation has been received (Y in the step S304), the process makes the transition to the step S305. In the case in which the predetermined confirmation operation has not been received (N in the step S304), the process makes the transition to the step S306.

In the step S305, the controller 20 clears all pieces of the installation angle variation information 211 in the storage device 21, and then the process makes the transition to the step S306.

In the step S306, the controller 20 instructs the light source controller 22 to put off the light source 11, and then the process makes the transition to the step S307.

In the step S307, the controller 20 powers OFF the projector 1 to make the transition to the standby state, and then the operation flow is terminated.

According to the embodiment described above, the following advantages can be obtained.

According to the projector 1 related to the present embodiment, in the case in which the projector 1 is moved during the operation, and the variation in the installation angle is detected, the fact that the variation in the installation angle has occurred is announced when powering OFF the projector 1. Thus, it becomes possible to notify the user of the fact that the installation angle of the projector 1 has varied during the operation. For example, it is possible to notify the user afterward (at power OFF) of the fact that the variation in the installation angle has occurred in the projector 1 during the unattended demonstration. Therefore, it becomes possible to prompt the user to take a measure such as the readjustment of the installation place of the projector 1 or the prevention of the movement of the projector 1.

Further, since the installation angle variation information 211 is recorded after the predetermined time T1 elapses from when powering ON the projector 1, it becomes possible to prevent the installation angle variation information 211 from being recorded during the initial setting such as an adjustment of the installation position of the projector 1 with an external image output device connected after powering ON the projector 1.

Further, in the case in which the variation in the installation angle of the projector 1 is detected during the operation, the time of the detection is recorded. Since this makes it possible to notify the user afterward of the time when the variation in the installation angle has occurred, it becomes possible to make use of the time of the variation to identify the factor of the variation in the installation angle of the projector 1.

Further, even in the case in which the projector 1 is moved during the operation to get into the state in which the variation in the installation angle occurs repeatedly, it becomes possible to ensure the safety of the projector 1 by powering OFF the projector 1.

Further, since the fact that the variation in the installation angle has occurred the last time the projector 1 operates is announced when powering ON the projector 1, it becomes possible to more surely notify the user of the fact that the installation angle of the projector 1 has been varied during the operation. Thus, it becomes possible for the user to check the notification contents again at power ON even in the case in which the notification contents fail to be checked when powering OFF the projector 1 the last time.

Further, the embodiment described above can also be modified as follows.

Modified Example 1

In the embodiment described above, it is also possible to arrange that the power-OFF is performed in the case in which the fact that the variation in the installation angle exceeds a predetermined value has been detected. Thus, it becomes possible to ensure the safety of the projector 1 by powering OFF the projector 1 in the case in which a large variation in the installation angle occurs in the projector 1.

What is claimed is:

1. A projector comprising:
    an image projection device adapted to modulate light emitted from a light source in accordance with image information based on an image signal input from an image input terminal, and then project the light modulated on a projection surface;
    an angle detector adapted to detect an installation angle of the projector;
    a keystone distortion correction device adapted to perform a keystone distortion correction of a projection image projected on the projection surface based on the installation angle detected by the angle detector;
    a storage device adapted to store information; and
    a controller adapted to record a variation in the installation angle as installation angle variation information on the storage device in a case in which the angle detector detects the variation when the projector is in operation,
    wherein the controller checks whether or not the installation angle variation information is recorded on the storage device in a power-OFF sequence of the projector, and then announces occurrence of the variation in the installation angle in a case in which at least one piece of the installation angle variation information is recorded on the storage device.

2. The projector according to claim 1, wherein
    the controller records the installation angle variation information on the storage device after a predetermined time elapses from when powering ON the projector.

3. The projector according to claim 1, further comprising:
    a timing section adapted to measure a time,
    wherein the installation angle variation information includes the time, at which the angle detector detects the variation in the installation angle, obtained from the timing section.

4. The projector according to claim 1, wherein
    the controller powers OFF the projector in a case of recording a larger number of pieces of the installation angle variation information than a predetermined number when the projector is in operation.

5. The projector according to claim 1, wherein
    the controller checks whether or not the installation angle variation information is recorded on the storage device in a power-ON sequence of the projector, and then announces occurrence of the variation in the installation angle of the projector in a case in which at least one piece of the installation angle variation information is recorded.

6. A control method of a projector comprising:
    providing
        an image projection device adapted to modulate light emitted from a light source in accordance with image information based on an image signal input from an image input terminal, and then project the light modulated on a projection surface, and
        a storage device adapted to store information;
    detecting an installation angle of the projector;
    performing a keystone distortion correction of a projection image projected on the projection surface based on the installation angle;
    recording a variation in the installation angle as installation angle variation information on the storage device in a case in which the variation is detected when the projector is in operation; and
    announcing, in a power-OFF sequence of the projector, occurrence of the variation in the installation angle in a case in which at least one piece of the installation angle variation information is recorded.

* * * * *